US009955681B1

(12) United States Patent
Yang

(10) Patent No.: US 9,955,681 B1
(45) Date of Patent: May 1, 2018

(54) FISHING TIP-UP DEVICE

(71) Applicant: Thomas Y. Yang, Brooklyn Park, MN (US)

(72) Inventor: Thomas Y. Yang, Brooklyn Park, MN (US)

( * ) Notice: Subject to any disclaimer, the term of this patent is extended or adjusted under 35 U.S.C. 154(b) by 429 days.

(21) Appl. No.: 14/708,628

(22) Filed: May 11, 2015

(51) Int. Cl.
A01K 97/12 (2006.01)
A01K 97/01 (2006.01)

(52) U.S. Cl.
CPC .............. A01K 97/12 (2013.01); A01K 97/01 (2013.01)

(58) Field of Classification Search
CPC ........ A01K 97/12; A01K 97/00; A01K 97/01; A01K 97/11
See application file for complete search history.

(56) References Cited

U.S. PATENT DOCUMENTS

| 4,197,668 | A | * | 4/1980 | McKinsey | A01K 97/11 43/15 |
| 5,050,332 | A | * | 9/1991 | Cross | A01K 97/11 43/15 |
| 5,076,001 | A | * | 12/1991 | Coon | A01K 97/11 43/15 |
| 5,890,312 | A | * | 4/1999 | Ball | A01K 97/01 43/15 |
| 5,903,998 | A | * | 5/1999 | Hawkins | A01K 97/11 43/15 |
| 6,050,020 | A | * | 4/2000 | Sizemore | A01K 97/11 43/15 |
| 6,446,379 | B1 | * | 9/2002 | James | A01K 97/10 43/17 |
| 8,567,108 | B1 | * | 10/2013 | Babbs | A01K 97/11 43/15 |
| 2004/0040197 | A1 | * | 3/2004 | Black | A01K 97/11 43/15 |
| 2015/0245601 | A1 | * | 9/2015 | Herzog | A01K 97/11 43/15 |
| 2016/0165870 | A1 | * | 6/2016 | Nichols | A01K 97/11 43/16 |

* cited by examiner

Primary Examiner — Christopher R Harmon
(74) Attorney, Agent, or Firm — Dave Alan Lingbeck

(57) ABSTRACT

A fishing tip-up device for signaling when a fish is on the fishing hook. The fishing tip-up device includes a base assembly including a base member; a support assembly in communication with the base member and including a fishing pole support and a trip support; a trip assembly including a trip member pivotably mounted to the trip support and including a biased element in communication with the fishing pole support; and a fishing pole assembly including a pole holder in communication with the fishing pole support, a fishing pole coupled to the pole holder, and a spool of fishing line mounted to the fishing pole support with the fishing line in communication with the fishing pole.

7 Claims, 3 Drawing Sheets

US 9,955,681 B1

FISHING TIP-UP DEVICE

BACKGROUND OF THE INVENTION

Field of the Invention

The present invention relates to fish strike detectors and more particularly pertains to a new fishing tip-up device for signaling when a fish is on the fishing hook.

Description of the Prior Art

The use of fish strike detectors is known in the prior art. More specifically, fish strike detectors heretofore devised and utilized are known to consist basically of familiar, expected and obvious structural configurations, notwithstanding the myriad of designs encompassed by the crowded prior art which have been developed for the fulfillment of countless objectives and requirements.

The prior art describes a mechanism with signaling flag mounted on a flexible staff for movement between a stowed position and a signaling position and with a mechanism provided for moving the rod in the direction away from the base in response to tension force being applied to the fishing line to set the hook. Another prior art describes a tip-up device for removably securing a handle of the rod and a means for removably securing the shaft of the rod with a trigger mechanism positioned on the base to releasably secure the fishing line. Also another prior art describes a tip-up system for ice fishing which incorporates a heated housing for preventing ice fishing hole freezer over, means for imparting motion to bait secured to a fish line carried by a fishing pole, and a signal-flag, tip-up arrangement carried by the fishing pole. Yet, another prior art describes a trip device operating to release a spring elastic flag pole when a fish strikes the line. The flag pole springs upright and is caused to depress a push-button transmitter switch mounted on the frame. The switch sends a signal to a remote receiver which generates an alarm signal to alert the fisherman. While these devices fulfill their respective, particular objectives and requirements, the aforementioned patents do not disclose a new fishing tip-up device.

SUMMARY OF THE INVENTION

The general purpose of the present invention, which will be described subsequently in greater detail, is to provide a new fishing tip-up device which has many of the advantages of the fish strike detectors mentioned heretofore and many novel features that result in a new fishing tip-up device which is not anticipated, rendered obvious, suggested, or even implied by any of the prior art fish strike detectors, either alone or in any combination thereof. The present invention includes a base assembly including a base member, a support assembly in communication with the base member and including a fishing pole support and a trip support, a trip assembly including a trip member pivotably mounted to the trip support and including a biased element in communication with the fishing pole support, and a fishing pole assembly including a pole holder in communication with the fishing pole support, a fishing pole coupled to the pole holder, and a spool of fishing line mounted to the fishing pole support with the fishing line in communication with the fishing pole. None of the prior art includes the combination of the elements of the present invention.

There has thus been outlined, rather broadly, the more important features of the fishing tip-up device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new fishing tip-up device which has many of the advantages of the fish strike detectors mentioned heretofore and many novel features that result in a new fishing tip-up device which is not anticipated, rendered obvious, suggested, or even implied by any of the prior art fish strike detectors, either alone or in any combination thereof.

Still another object of the present invention is to provide a new fishing tip-up device for signaling when a fish is on the fishing hook.

Still yet another object of the present invention is to provide a new fishing tip-up device that allows the fish to take the hook a short distance and then the fishing rod pops up upward to signal a fish has been snagged.

Even still another object of the present invention is to provide a new fishing tip-up device that sets the hook in the fish with the fishing rod popping upward.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
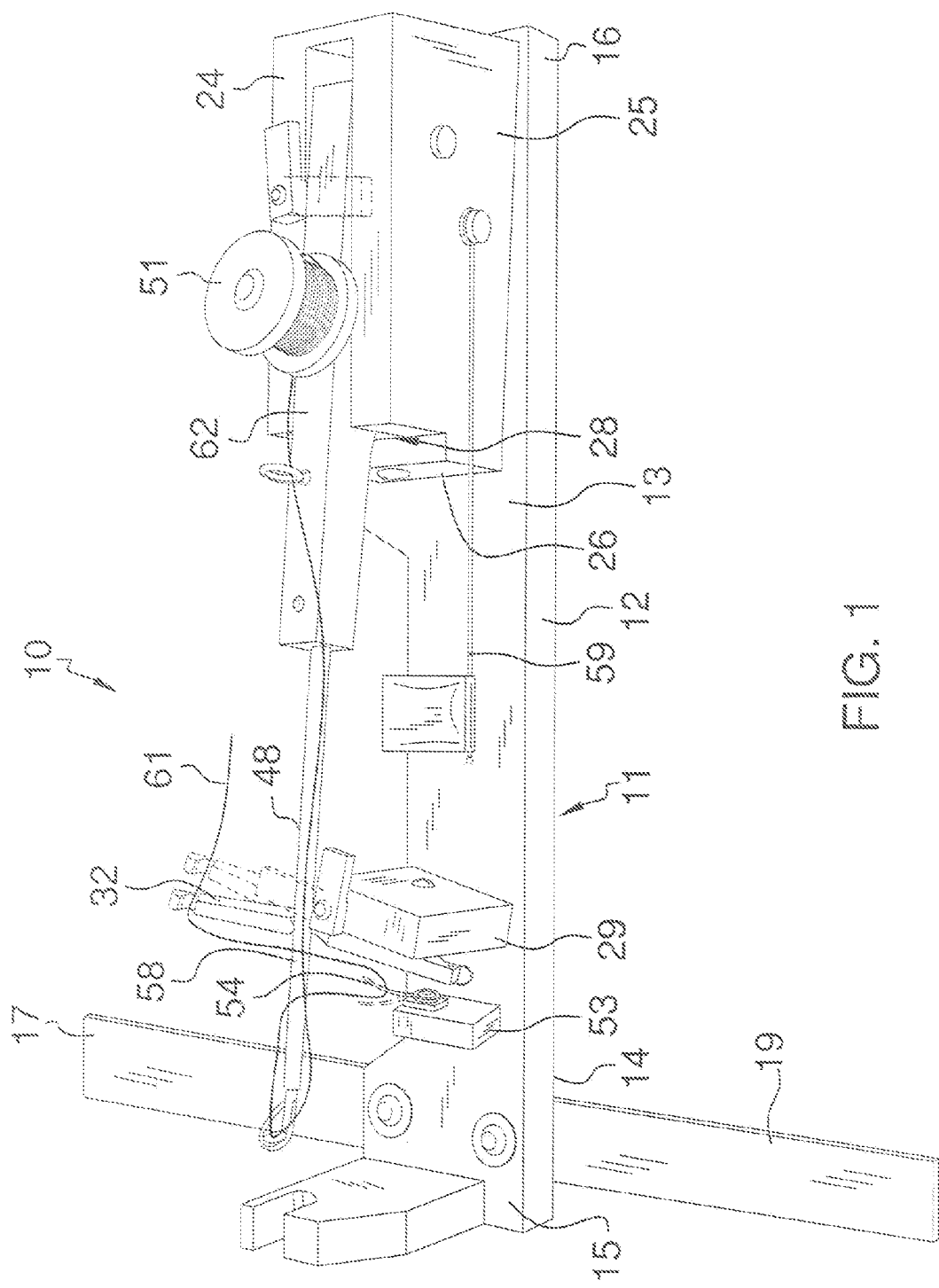
FIG. 1 is top perspective view of the fishing tip-up device.
Figure 2:
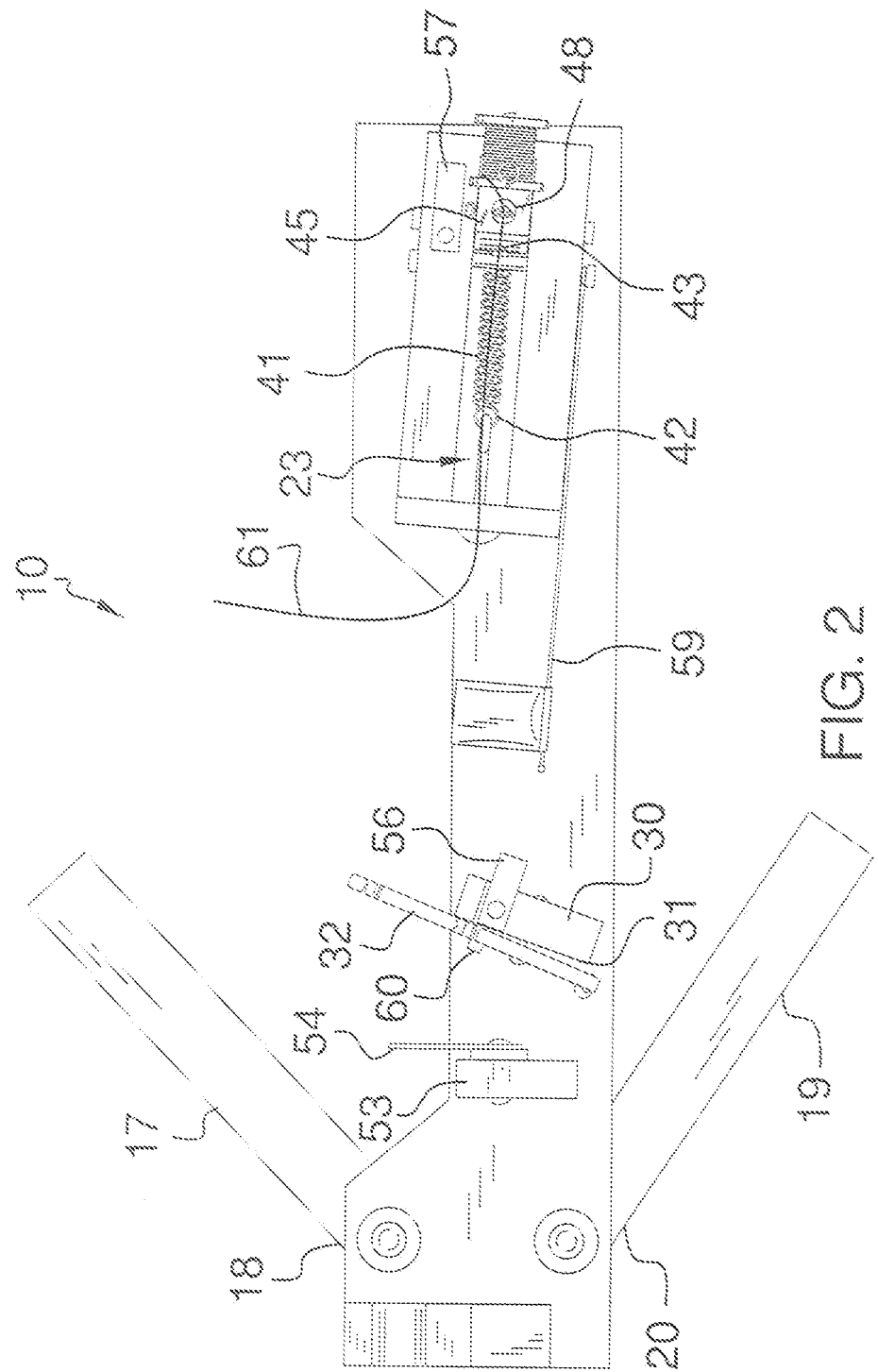
FIG. 2 is a top plan view of the invention
Figure 3:
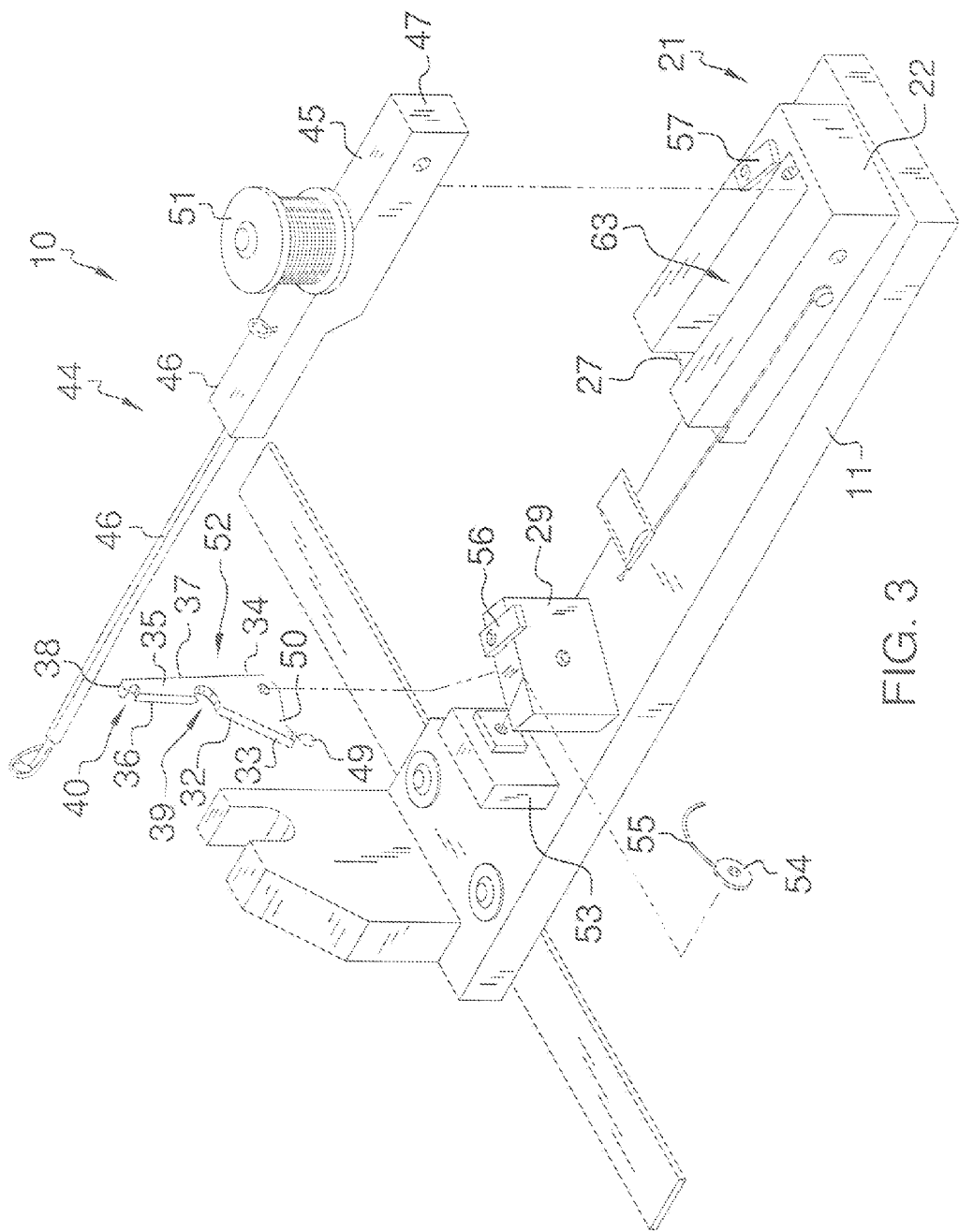
FIG. 3 is a partial exploded perspective view of the invention.

With reference now to the drawings, and in particular to FIGS. 1 through 3 thereof, a new fishing tip-up device embodying the principles and concepts of the present invention and generally designated by the reference numeral 10 will be described.

As best illustrated in FIGS. 1 through 3, the fishing tip-up device 10 generally may comprise a base assembly 11 including a base member 12 and, may also comprise a support assembly 21 in communication with the base member 12 and including a fishing pole support 22 and a trip support 29, and may further comprise a trip assembly 61 including a trip member 32 pivotably and conventionally mounted with a fastener to the trip support 29 and including a biased element 41 in communication with the fishing pole support 22, and may, in addition comprise a fishing pole assembly 44 including a pole holder 45 in communication with the fishing pole support 22, a fishing pole 48 connected to the pole holder 45, and a spool 51 of fishing line 61 mounted to the fishing pole support 22 with the fish line 61 in communication with the fishing pole 48 and conventionally connected to a fish hook (not shown).

As illustrated in FIGS. 1-3, the base member 12 may be elongated with first and second ends 15, 16 and may have a top side 13 and bottom side 14. The base assembly 11 may also include elongate stabilizing members 17, 19 each having an end 18, 29 pivotably and conventionally coupled with a fastening member to the bottom side 14 near the first end 15 of the base member 12 and are selectively pivotable towards and away from the base member 12. The fishing pole support 22 may be conventionally mounted upon the top side 13 and near the second end 16 of the base member 12 and may have an end wall 26 and side walls 24, 25 and an open top 63 with a cavity 23 disposed therein. The end wall 26 may have a slot 28 disposed therein through a top edge 64 thereof and removably receiving a portion 62 of the pole holder 45. The trip support 29 may be conventionally disposed and mounted upon the top side 13 and intermediate of the base member 12 and may have a top 30 and a side 31 and a stopper 60 conventionally attached to and extending from the side 31. The trip member 32 is a lever 32 having a first portion 33, a second portion 35 and an intermediate portion 34 disposed between the first and second portions 33, 35 and pivotably and conventionally mounted with a bolt to the side 31 of the trip support 29. The second portion 35 may be angled relative to the first portion 33 and may have an inner edge 36 and an outer edge 37 with the inner edge 36 distanced closer to the first portion 33 than that of the outer edge 37. The inner edge 36 of the second portion 35 may have a first slot 39 disposed therein adjacent to the intermediate portion 34 and may have a second slot 40 disposed therein at a distal end 38 thereof.

As shown in FIGS. 1 and 3, the fishing pole 48 may have a portion 58 which may be removably received in the first slot 39 of the lever 32 and the fishing line 61 may be removably received through the second slot 40 of the lever 32. The support assembly 21 further includes a first latch 56 pivotably and conventionally coupled to the trip support 29 and engagable with the fishing pole 48 to secure and store the fishing pole 48 when not in use with the fishing pole 48 being removably received in the first slot 39 of the lever 32, and may also include a second latch 57 pivotably and conventionally coupled to the fishing pole support 22 and engagable with the pole holder 45 to secure and store the fishing pole 48 when not in use with the fishing pole 48 being removably received in the first slot 39 of the lever 32. The trip assembly may also include a weighted member 49 conventionally disposed at a distal end 50 of the first portion 33 to pivotably tilt the second portion 35 upwardly relative to the first portion 33 and to the base member 12 with the stopper 60 in contactable relationship with the outer edge 37 of the second portion 35 to limit pivoting of the lever 32.

As shown in FIGS. 1 and 3, the pole holder 45 may have a first end 46 and a second end 47 with the second end 47 pivotably and conventionally disposed and supported in the cavity 23 of the fishing pole support 22 and with the fishing pole 48 conventionally extending from the first end 46 of the pose holder 45.

As shown in FIG. 2, the trip assembly may further include the biased element 41, which is preferably a compression spring, conventionally disposed in the cavity 23 and having a first end 42 and a second end 43 with the second end 43 conventionally coupled to the second end 47 of the pole holder 45 and the first end 42 conventionally coupled to the end wall 26 of the fishing pole support 22 for biasing the fishing pole 48 into an upright vertical position and a perpendicular position relative to the base member 12 upon a fish moving the fishing line 61.

As illustrated in FIGS. 1-3, the support assembly 21 may also include a resistance support 53 conventionally disposed and mounted on the top side 13 of the base member 12 between the trip support 29 and the first end 15 of the base member 12. The trip assembly 52 may further include a resistance member 54 which is resistibly adjustable and pivotably and conventionally mounted to the resistance support 53 and engagable with the fishing line 61 to delay releasing and tripping the fishing pole 48 from the lever 32 and biasing the fishing pole 48 upwardly and outwardly from the base member 12 in an upright position. The resistance member 54 is a hook 54 having a curved end portion 55 which is engagable with the fishing line 61. The support assembly 21 may also include a marker member pivotably and conventionally mounted to one of the side walls 25 of the fishing pole support 22 to indicate positioning of the fishing tip-up device 10 on the water or ice.

In use, the base member 12 may be positioned over a fishing hole upon water. The fishing pole 48 and the fishing line 61 may be engaged with the trip member 32 and the fishing line 61 may be casted into the water with the fishing pole 48 substantially parallel to the base member 12. A portion 58 of the fishing pole 48 may be engaged in the first slot 39 and the fishing line 61 may be strung through the second slot 40 with the second portion 35 pivotably tilted upwardly relative to the first portion 33 to retain the fishing pole 48 and the fishing line 61 in a respective first and second slots 39, 40. The trip member 32 may trip upon a fish moving the fishing line 61 with the fishing pole 48 released from the trip member 32 and biasing upwardly substantially perpendicular to the base member 12 to signal a fish on a hook (not shown) connected to the fishing line 61. The trip member 32 may trip and pivot upon the fishing line 61 pulling down on the second portion 35 of the lever 32 causing the lever 52 to pivot whereupon the fishing pole 48 is disengaged from the first slot 39 with the biased element 41 causing the fishing pole 48 to pivot upwardly and perpendicular to the base member 12.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the fishing tip-up device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing tip-up device comprising:
a base assembly including a base member, wherein the base member is elongated with first and second ends and has a top side and bottom side, wherein the base assembly also includes elongate stabilizing members each having an end pivotably coupled to the bottom side near the first end of the base member and are selectively pivotable towards and away from the base member;
a support assembly in communication with the base member and including a fishing pole support and a trip support, wherein the trip support is disposed upon the top side and intermediate of the base member and has a top and a side with a stopper attached to and extending from the side;
a trip assembly including a trip member pivotably mounted to the trip support and including a biased element in communication with the fishing pole support, wherein the trip member is a lever having a first portion, a second portion and an intermediate portion disposed between the first and second portions and pivotably mounted to the side of the trip support; and
a fishing pole assembly including a pole holder in communication with the fishing pole support, a fishing pole coupled to the pole holder, and a spool of fishing line mounted to the fishing pole support with the fishing line in communication with the fishing pole.

2. The fishing tip-up device as described in claim 1, wherein the second portion is angled relative to the first portion and has an inner edge and an outer edge with the inner edge distanced closer to the first portion than that of the outer edge; wherein the inner edge of the second elongate portion has a first slot disposed therein adjacent to the intermediate portion and has a second slot disposed therein at a distal end thereof.

3. The fishing tip-up device as described in claim 2, wherein the trip assembly also includes a weighted member disposed at a distal end of the first portion to pivotably tilt the second portion upwardly relative to the first portion and to the base member with the stopper in contactable relationship with the outer edge of the second portion to limit pivoting of the lever.

4. The fishing tip-up device as described in claim 2, wherein the fishing pole has a portion which is removably received in the first slot of the lever and the fishing line is removably received through the second slot of the lever.

5. The fishing tip-up device as described in claim 4, wherein the support assembly further includes a first latch pivotably coupled to the trip support and engagable with the fishing pole to secure and store the fishing pole when not in use with the fishing pole removably received in the first slot of the lever, and also includes a second latch pivotably coupled to the fishing pole support and engagable with the pole holder to secure and store the fishing pole when not in use with the fishing pole removably received in the first slot of the lever.

6. The fishing tip-up device as described in claim 1, wherein the support assembly also includes a resistance support mounted on the top side of the base member between the trip support and the first end of the base member; wherein the trip assembly further includes a resistance member which is resistibly adjustable and pivotably mounted to the resistance support and engagable with the fishing line to delay releasing the fishing pole from the lever and biasing the fishing pole upwardly and outwardly from the base member in an upright position.

7. The fishing tip-up device as described in claim 6, wherein the resistance member is a hook having a curved end portion which is engagable with the fishing line.

* * * * *